United States Patent [19]

Yoldas et al.

[11] Patent Number: 4,687,652

[45] Date of Patent: Aug. 18, 1987

[54] LOW TEMPERATURE FORMATION OF MULLITE USING SILICON ALKOXIDE AND ALUMINUM ALKOXIDE

[75] Inventors: Bulent E. Yoldas; Deborah P. Partlow, both of Pittsburgh, Pa.

[73] Assignee: The United States of America as represented by the Secretary of the Air Force, Washington, D.C.

[21] Appl. No.: 867,727

[22] Filed: May 28, 1986

[51] Int. Cl.$^4$ .............................................. C01B 33/26
[52] U.S. Cl. .................................... 423/327; 501/128
[58] Field of Search .................... 423/327, 328, 328 C, 423/329; 501/128

[56] References Cited

U.S. PATENT DOCUMENTS 3,336,108  8/1967  Leatham et al. ..................... 423/118
3,922,333  11/1975  Mazdiyasni et al. ................ 423/327
4,272,500  6/1981  Eggerding et al. ................. 423/327
4,418,025  11/1983  Prochazka et al. .................. 264/1.2

OTHER PUBLICATIONS

B. E. Yoldas, "Microstructure of Monolithic Materials Formed by Heat Treatment of Chemically Polymerized Precursors in the $Al_2O_3$—$SiO_2$ Binary", Ceramic Bulletin, vol. 59, No. 4, 479–83, (1980).

B. B. Ghate et al, "Synthesis and Characterization of High Purity, Fine Grained Mullite", Ceramic Bulletin, vol. 52, No. 9, 670–72, (1973).

K. S. Mazdiyasni et al, "Synthesis and Mechanical Properties of Stoichiometric Aluminum Silicate (Mullite)", J. Am. Ceram. Soc., 55[11], 548–552 (1972).

*Primary Examiner*—John Doll
*Assistant Examiner*—Jackson Leeds
*Attorney, Agent, or Firm*—Charles E. Bricker; Donald J. Singer

[57] ABSTRACT

A method for preparing mullite ($3Al_2O_3.2SiO_2$) by partially hydrolyzing a dilute silicon alkoxide solution, combining an aluminum alkoxide with the partially hydrolyzed silicon alkoxide, eliminating terminal alkoxide groups and firing the material to about 985° C.

7 Claims, No Drawings

LOW TEMPERATURE FORMATION OF MULLITE USING SILICON ALKOXIDE AND ALUMINUM ALKOXIDE

RIGHTS OF THE GOVERNMENT

The invention described herein may be manufactured and used by or for the Government of the United States for all governmental purposes without the payment of any royalty.

BACKGROUND OF THE INVENTION

This invention relates to a process for preparing high purity, stoichiometric aluminum silicate (mullite).

Mullite ($3Al_2O_3.2SiO_2$) has long been known in the ceramic and refractory industries. Mullite is the most stable compound in the $Al_2O_3$-$SiO_2$ system. Consequently, it occurs as a main constituent in a large number of ceramic products which are fabricated from aluminosilicate materials. Considerable amounts of mullite are used to produce refractory bodies designed to withstand high temperatures. Its relatively low thermal coefficient of expansion makes such refractories more resistant to thermal stress in constrast to similar bodies prepared from aluminum oxide materials.

Mullite possesses a dielectric constant of approximately 5 to 6 and therefore presents a very attractive electrical characteristic as integrated circuit technology continues advancing to higher speed circuit devices. Moreover, mullite's low thermal coefficient of expansion offers an excellent match to large silicon integrated circuit chips or glass layers which may be placed on substrates. Although mullite has been mentioned for use as multi-layer electronic substrates for integrated circuit devices, high purity, dense substrates are not known to exist.

Commercially available mullite always contains significant amounts of impurities such as silica, iron oxide, and titania. These impurities influence the physical, electrical and chemical properties of the mullite, which in turn affect the ceramic compositions of which mullite may be embodied in.

The most common technique for mullite fabrication involves the heating of clays, feldspars, kyanites, etc. to a temperature in excess of 1300° C. The degree of completeness of the reaction is dependent on temperature and the time the sample is held at temperature. The higher the reaction temperature, the less the dwell time at temperature. During heating, the clay structure breaks down to form mullite and an amorphous silica phase. This silica glass is very viscous and can either crystallize to a crystalline silica phase or it can react with excess alumina that may have been added to the initial raw material mixture. This reaction will also yield mullite. Again, the degree of completion of this reaction is dependent on temperature and sample time at temperature.

If alumina and clay are mixed in the proper properties, production of a 100% mullite body is feasible. However, as the chemical reaction sequence has a volume change associated with it, the fabrication of 100% mullite articles by this technique to rigid dimensional specifications becomes very difficult, if not impossible. Therefore, the common method to circumvent this problem is to pre-react a portion of the material to 100% mullite and then grind this material and add it to a mixture of the initial raw material mixture. The ceramic industry term for any pre-reacted material is grog. This mixture of grog and initial raw material mixture often called binder is then fabricated into the desired shape and sintered at a high temperature to convert the raw material mixture to mullite and drive the sintering reaction to a satisfactory end-point. Variations of this technique are possible.

Mullite can also be fabricated by processes that do not use any glass phase point in the process. This solid state reaction technique makes use of the fact that the equilibrium $Al_2O_3$-$SiO_2$ phase diagram predicts that if $Al_2O_3$ and $SiO_2$ are in contact and heated sufficiently, mullite will form as a natural product. This technique requires that the $Al_2O_3$ and $SiO_2$ to diffuse to a common boundary and react chemically. The distance the constitutents diffuse is primarily influenced by the temperature, the time the material is held at temperature, and the particle size of the raw materials.

High purity, submicron mullite powder can be prepared by hydrolytically decomposing a mixture of stoichiometric amounts of aluminum tris-isopropoxide and a silicon tetra-alkoxide in the presence of a weak base or very dilute mineral acid. Mullite has also been prepared by reacting clear, aqueous alumina sol with silicon tetraethoxide.

It is an object of the present invention to provide a novel method for the preparation of mullite.

Other objects, aspects and advantages of the present invention will be apparent to those skilled in the art from the following disclosure of the invention.

SUMMARY OF THE INVENTION

In accordance with the present invention there is provided a novel method for preparing high purity mullite which comprises the steps of
(a) partially hydrolyzing a dilute silicon alkoxide solution;
(b) adding an aluminum alkoxide to the partially hydrolyzed, dilute silicon alkoxide solution; and
(c) eliminating terminal alkoxide groups.

In one embodiment of the invention, the liquid is evaporated out and the remaining material is calcined at about 500° C. to yield an amorphous structure having the mullite composition. Further heating to about 650° C. eliminates alkoxide terminal groups still present in the amorphous material. Firing the material to about 985° C. converts the amorphous material to crystalline mullite.

In another embodiment of the invention, the solution resulting from step (b), above, is further hydrolyzed using a relatively small amount of water. A solution prepared in this manner will yield a clear gel and may be used to deposit a coating on a substrate. Firing the deposited coating to about 985° C. converts the amorphous material to crystalline mullite.

In yet another embodiment of the invention, the solution resulting from step (b), above, is further hydrolyzed using a relatively large amount of water to produce a precipitate. This precipitate converts to mullite at about 985° C.

DETAILED DESCRIPTION OF THE INVENTION

The aluminum and silicon alkoxides may be prepared using techniques known in the art. As one example, aluminum tris-isopropoxide may be prepared by the reaction of aluminum metal foil of 99.94% purity with excess isopropyl alcohol using about $10^{-4}$ mol of $HgCl_2$ per mol of Al as a catalyst. The reaction that occurs is shown by the following general equation:

$$Al + 3ROH \xrightarrow{HgCl_2} Al(OR)_3 + 3/2\ H_2$$

wherein R is a $C_1$ to $C_4$ alkyl group. As another example, silicon tetrakis isopropoxide may be prepared by reacting silicon tetrachloride of 99.9+% purity with isopropyl alcohol. The reaction that occurs is shown by the following general equation:

$$SiCl_4 + 4ROH \rightarrow Si(OR)_4 + 4HCl$$

wherein R is a $C_1$ to $C_4$ alkyl group. In general, any of the $C_1$ to $C_4$ alcohols may be used in the present invention, e.g., methanol, ethanol, n-propanol, i-propanol, n-butanol, i-butanol, t-butanol and sec-butanol.

The silicon alkoxide is diluted with one of the above-listed alcohols, preferably the alcohol corresponding to the alkoxy group of the silicon alkoxide, to a concentration low enough to avoid gellation when later hydrolyzed, e.g., about 10 weight percent equivalent oxide or less.

The dilute silicon alkoxide is then partially hydrolyzed by adding about 0.1 to 1.0 moles of water per mole of the total of the silicon alkoxide already present plus the stoichiometric quantity of aluminum alkoxide to be later added. The dilute silicon alkoxide to which the water has been added is allowed to stand for a short period, e.g., about 5 to 15 minutes, to at least partially hydrolyze the silicon alkoxide.

A stoichiometric quantity of the aluminum alkoxide is next added to the partially hydrolyzed silicon alkoxide solution. Solution concentration of the combined mixture should be maintained sufficiently low to avoid gellation, generally about 10% by weight equivalent oxide, or less. The term "equivalent oxide" as used herein, and in the claims, is intended to mean the stoichiometric equivalent in terms of the oxide of the aluminum and/or silicon component. The solution concentration can be adjusted by diluting the water component or the aluminum alkoxide, or both, with a suitable alcohol, as listed previously.

Addition of the aluminum alkoxide is followed by a reaction period of about 8 to 48 hours, at an elevated temperature in the approximate range of 50° C. to 0° C., preferably about 30° C. to 10° C., below the normal boiling temperature of the alcohol diluent. The solution may be stirred, if desired, during the reaction period to ensure thorough mixing. The reaction vessel is preferably equipped with means, such as a reflux condenser, to prevent loss of the diluent. Following the reaction period, the solution, hereinafter referred to as the product solution, is cooled to ambient temperature. The overall reaction is given by the following general equation:

$$6Al(OR)_3 + 2Si(OR)_4 + xH_2O \rightarrow 2Al_3Si(OH)_{13}\cdot xH_2O + 26ROH$$

The product solution is stable, at ambient temperature, for a relatively long period. Product solutions have been observed to be stable at room temperature for as long as three months.

Amorphous stoichiometric mullite can be recovered from the above product solution as a powder or as a coating on a substrate. If a powder product is desired, the alcohol(s) may be evaporated off, leaving an amorphous gel having the mullite composition, with terminal alkoxide groups still present. Alternatively, a very fine powder may be obtained by mixing water with the product solution, which causes the mullite composition in the form of hydroxyaluminosilicate to precipitate out of the solution. In a presently preferred embodiment, the product solution is diluted about 1:1, by weight, with dry ethanol or other suitable alcohol, prior to mixing the product solution with the water. The amount of water used to precipitate out the hydroxyaluminosilicate is not critical. In general, the amount used will be sufficient to dilute the alcohol to about 60 to 75% (w/w). The powder can be recovered by filtration.

If the mullite composition is recovered as an amorphous gel, as mentioned above, the gel can be converted to an amorphous oxide state by calcination at a temperature in the range of about 500° to 700° C. for about 1 to 24 hours. The material can be calcined statically (without the tumbling) or dynamically (with tumbling). Calcination at or near the lower calcination temperature yields a dark colored powder containing terminal alkoxide groups, while calcination at or near the higher calcination tempereature yields a clear product.

Recovery of material by dilution with excess water, as described above, directly yields an amorphous, finely divided powder having the mullite composition. Following separation from the liquid, the powder may be dried under vacuum, at, for example, 50° to 70° C., 0.5 to 2 mm Hg, 1 to 24 hours, to ensure dehydration of hydroxyaluminosilicate to amorphous mullite as shown by the following equation:

$$2Al_3Si(OH)_{13} \rightarrow 3Al_2O_3 \cdot 2SiO_2 + 13H_2O$$

The powder recovered from the drying step can, optionally, be calcined, as described above.

The amorphous mullite powder, obtained by either of the above methods is converted to crystalline mullite by heating the powder at a temperature of about 985°–1000° C. for about 1 to 24 hours, either statically or dynamically. Higher temperatures are not required, inasmuch as differential thermal analysis of the powder indicates conversion to the crystalline form at about 985° C.

As mentioned previously, the product solution can be coated onto a substrate. The coating can then be converted to a crystalline mullite.

To prepare a solution for coating onto a substrate, the product solution is diluted with an amount of suitable alcohol sufficient to lower the concentration of equivalent oxides to about 5 weight percent or lower. To this quantity of alcohol is added a quantity of water sufficient to hydrolyze the terminal alkoxy groups in the mixture. A small quantity, generally about 0.5 w% or less, of a mineral acid, e.g., 70% nitric acid, is added to the diluted solution to promote dissolution and cause clearing of the solution.

The diluted solution is applied to a suitable substrate by spraying, dipping, spreading, etc. The term "substrate" includes any material having high temperature stability, e.g., metals, ceramic materials and the like. The coated substrate is heated in air to about 500° C. for about 15 min. to form a clear amorphous film thereon. Further heating in air to about 985° to 1000° C. converts the amorphous layer to the crystalline mullite structure.

The following examples illustrate the invention.

EXAMPLE I 69.5 g (0.33 mole) of tetraethylorthosilicate, Si(OC$_2$H$_5$)$_4$, was mixed into a liquid mixture containing 400 g of dry ethanol, 14.0 g distilled water and 0.009 g of 70% nitric acid. The resulting mixture was allowed to stand in a closed container for about 5 minutes at room temperature. 250 g (1.015 moles) of aluminum secondary butoxide, Al(OC$_4$H$_9$)$_3$, was added to the mixture in the container. The container was closed and shaken briefly to mix the ingredients. This mixing produced a stiff, gelatinous, opaque material which slowly dissolved, forming a milky liquid. The reaction mixture was then heated, with the container closed, to about 60° C. for about 16 hours. After about 30 minutes the material in the closed container took on a translucent appearance. After heating for several hours the material became clear. After the heating period, the material was allowed to cool to room temperature.

EXAMPLE II

A portion of the material obtained in Example I was placed in an open container at room temperature. Evaporation of the free alcohol from this portion yielded a clear gel. A portion of this amorphous gel was converted to an amorphous oxide state having the composition of mullite by heating in air at 500° C. for 1 hour. The oxide material ranged from brown to black. Another portion of the amorphous gel was heated in air at 650° C. for about 1 hour, yielding a clear product. Each of the above oxide products was converted to crystalline mullite by heating in air at 990° C. for 30 minutes.

EXAMPLE III 60 g of the material obtained in Example I was combined with 333.3 g of dry ethanol and 2.78 g water. The resulting milky liquid was allowed to stand overnight in a closed container. 2 g of 70% nitric acid was added to the mixture to promote dissolution and cause clearing of the solution.

The thus-cleared solution was deposited onto a fused silica substrate. The coated substrate was heated in air at 500° C. for 15 min. to form a clear amorphous film. Further heating in air to 990° C. yielded the crystalline mullite structure in the coating layer.

EXAMPLE IV 80 g. of the material obtained in Example I was combined with 80 g of dry ethanol in a closed container. 80 g of water was then added to this mixture, with stirring, causing precipitation of a fine powder. Excess liquid was evaporated off the powder. The dried amorphous powder was converted to crystalline mullite by heating in air to 1000° C. for 1 hour.

Various modifications of this invention can be made in view of the foregoing disclosure without departing from the spirit and scope of the invention.

We claim:
1. A method for preparing mullite which comprises the steps of:
   (a) partially hydrolyzing a solution of a silicon alkoxide in an alcohol by adding about 0.1 to 1.0 moles of water per mole of stoichiometric mullite to said silicon alkoxide solution;
   (b) adding a solution of an aluminum alkoxide in an alcohol to the resulting partially hydrolized silicon alkoxide solution in a ratio of 3 mols of aluminum alkoxide per mol of silicon alkoxide to provide a solution having a concentration of not greater than about 10 percent by weight equivalent oxide;
   (c) heating the resulting solution to a temperature about 50° to 0° C. below the normal boiling temperature of the alcohol diluent for about 8 to 48 hours;
   (d) recovering an amorphous material having the mullite composition from said resulting solution; and
   (e) heating said amorphous material to about 985° C. thereby converting said amorphous material to crystalline mullite.

2. The method of claim 1 wherein said silicon alkoxide has the formula Si(OR)$_4$, and said aluminum alkoxide has the formula Al(OR)$_3$, wherein R is methyl ethyl, n-propyl, i-propyl, n-butyl, i-butyl, t-butyl or sec-butyl, and wherein the R group in said silicon alkoxide and the R group in said aluminum alkoxide may be the same or different.

3. The method of claim 1 wherein the alcohol in which said silicon alkoxide is dissolved has an alkyl group which corresponds to the R group of said alkoxide.

4. The method of claim 1 wherein the alcohol in which said aluminum alkoxide is dissolved has an alkyl group which corresponds to the R group of said alkoxide.

5. The method of claim 1 wherein said recovery step (d) consists of evaporating free alcohol from said solution to yield an amorphous gel, and calcining said gel at a temperature in the approximate range of 500° to 700° C. for about 1 to 24 hours.

6. The method of claim 1 wherein said recovery step (d) consists of diluting said resulting solution with sufficient water to cause said material to precipitate out.

7. The method of claim 1 wherein said recovery step (d) consists essentially of the steps of
   (i) diluting said resulting solution with a C$_1$ to C$_4$ alcohol to reduce the concentration of equivalent oxides to not greater than about 5 weight percent;
   (ii) mixing a quantity of water sufficient to hydrolyze terminal alkoxy groups in the resulting diluted solution;
   (iii) coating a substrate with a layer of the solution resulting from step (ii); and
   (iv) heating the resulting coated substrate in air to form an amorphous film on said substrate.

* * * * *